Nov. 5, 1940.　　　O. V. TRACY　　　2,220,304
PRODUCTION OF HYDROCHLORIC ACID
Filed April 8, 1939
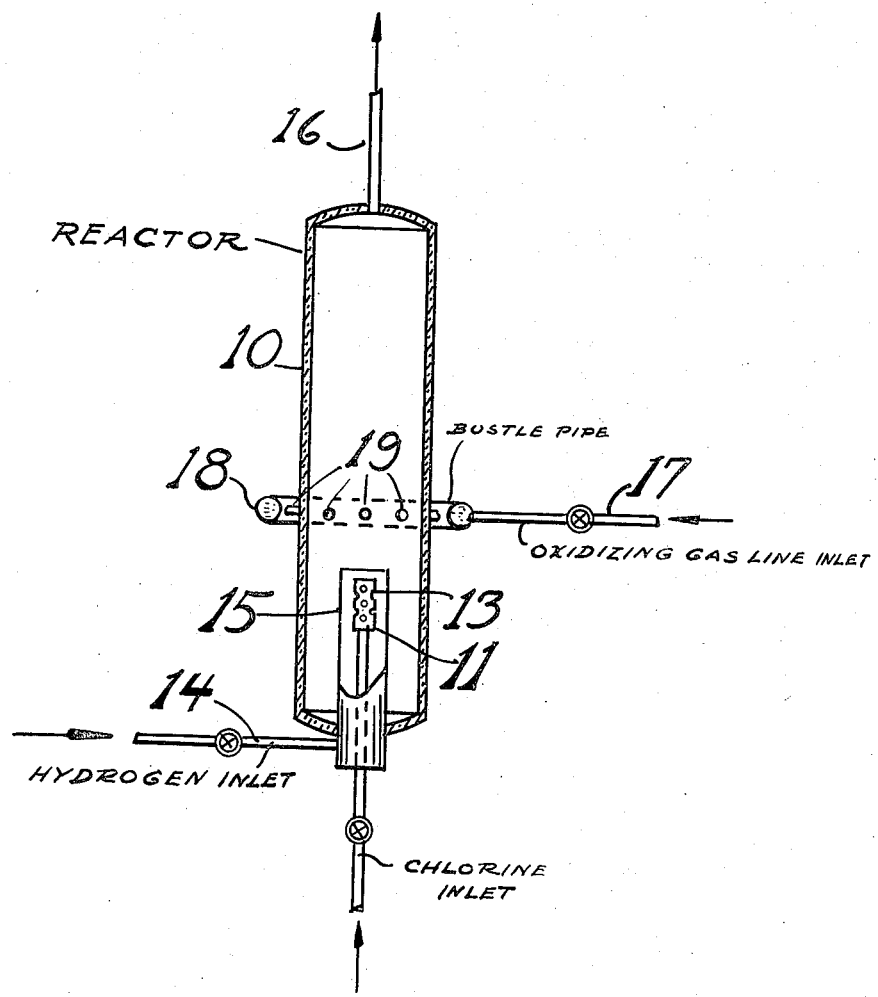
Osgood V. Tracy Inventor
By _____ Attorney Patented Nov. 5, 1940

2,220,304

UNITED STATES PATENT OFFICE 2,220,304

PRODUCTION OF HYDROCHLORIC ACID

Osgood V. Tracy, Greenside Lane, La., assignor to Standard Oil Development Company, a corporation of Delaware Application April 8, 1939, Serial No. 266,717

5 Claims. (Cl. 23—156)

This invention relates to the production of hydrochloric acid from hydrogen and chlorine and pertains more particularly to the synthesis of hydrochloric acid in which the hydrogen employed is contaminated with incompletely oxidized carbon containing gases.

It has heretofore been proposed to synthesize dry hydrochloric acid from hydrogen and chlorine by burning the two gases together. This reaction is highly exothermic, and as a result extremely high temperatures exist within the reaction zone. In view of this it has heretofore been necessary to employ relatively pure hydrogen such as electrolytic hydrogen completely free from incompletely oxidized carbonaceous gases in order to avoid rapid fouling of the reactor and subsequent equipment with free carbon deposits resulting from cracking of said carbonaceous gases. Consequently hydrogen produced by the water gas reaction and from other reactions in which the hydrogen was contaminated with incompletely oxidized carbon containing gases have heretofore been considered unsuitable for this reaction.

The object of the present invention is to provide an improved method of synthesizing hydrochloric acid capable of utilizing hydrogen containing incompletely oxidized carbon containing gases as a source of raw material such as hydrogen obtained from the water gas reaction wherein steam is reacted with hydrocarbons or other carbonaceous material to form carbon dioxide and hydrogen. For example hydrogen produced by reacting methane and steam in the presence of a catalyst normally contains about 10% of impurities such as methane, carbon monoxide and nitrogen.

I have discovered that by introducing into the reactor controlled quantities of an oxidizing gas such as air or steam after the main reaction between the hydrogen and chlorine has been substantially completed the carbon present can be converted into relatively harmless carbon dioxide so that the reactor and subsequent equipment is maintained substantially free of carbon deposits.

The invention is of particular importance in cases where the dry hydrochloric acid formed is utilized directly in the synthesis of other compounds in the presence of a catalyst such as in the synthesis of chlorinated hydrocarbons from the corresponding olefins in the presence of aluminum chloride as a catalyst, or from the corresponding alcohols in the presence of zinc chloride as a catalyst. In such cases it is important to maintain the hydrochloric acid gas substantially free of entrained carbon black to avoid rapidly fouling the catalyst or catalyst containing solution.

Having described the general nature and object, the invention will be better understood from the more detailed description of the specific embodiment hereinafter in which reference will be made to the accompanying drawing illustrating diagrammatically an apparatus suitable for carrying the invention into effect.

Referring now to the drawing the numeral 10 designates a hydrogen chlorine reactor preferably comprising a quartz tube or brick lined retort or other tubular conduit capable of withstanding high temperatures. The hydrogen and chlorine are introduced into the reactor 10 through a jet burner 11, preferably comprising spaced concentric perforated tubes. The chlorine is preferably introduced into the burner through line 12 leading to the inner perforated tube 13 and the hydrogen is preferably introduced through line 14 leading to the outer tube 15. These two gases may be reversed without appreciably affecting the results. The space between the inner and outer tubes 13 and 15 respectively forms a mixing chamber for the hydrogen and chlorine.

After combustion is established by igniting the mixed gases, the two gases instantly react to form hydrochloric acid gas. The mixed gases pass through the outer tube 15 to the main reaction tube 10 where the reaction continues to completion.

The reaction products consisting principally of hydrochloric acid together with such other impurities as may be formed or introduced into the reactor are withdrawn therefrom through line 16 and after being cooled the required amount may be passed to storage or passed to another apparatus for utilization of the hydrochloric acid directly. In most cases the products are cooled and dried before further use to avoid excessive corrosion.

In accordance with the present invention I introduce within the reactor, after the main reaction has been substantially completed and preferably at spaced points around the circumference, controlled amounts of air, or other oxidizing gas which under the temperatures existing within the reactor reacts with an incompletely oxidized carbon containing gas converting it into carbon dioxide.

By introducing the oxygen containing gas after the main reaction is substantially complete the carbon containing gas rather than hydrogen will be selectively oxidized. This is of particular advantage since any hydrogen burned by the air not only increases the amount of hydrogen required for a given yield of hydrochloric acid but the resulting water vapor increases the cost of drying the hydrochloric acid to avoid corrosion. In view of this, while it is possible to employ steam as an oxidizing agent for the carbon, it is preferred to employ air in order to reduce the cost of drying the reaction products.

Referring to the drawing the oxygen containing gas is introduced through line 17 to a bustle pipe 18 surrounding the reactor, from which it passes through tubes 19 into the reactor 10 at spaced points around the circumference.

By adding the oxidizing gas in this manner the air initially mixes with the outer fringe of the main reaction zone and tends to burn any unoxidized carbon which might otherwise deposit on the outer wall of the chamber.

By introducing the air as previously described it is possible to use hydrogen containing substantial amounts of unoxidized carbon containing gases such as are obtained for example by the water gas reaction.

Experience has shown that in the absence of the oxidizing gas, the reactor, cooling coils and other subsequent equipment rapidly becomes fouled with carbon, whereas when controlled amounts of air are introduced as described the process may be operated over indefinite periods without carbon difficulties.

The amount of air introduced will be determined by the amount of impurities contained within the hydrogen supply. It is preferred to employ only sufficient amount to avoid carbon difficulties since any excess may tend to react with unreacted hydrogen thus increasing the amount of water which must be removed.

Having described the specific embodiment it is understood that the invention embraces such other variations and modifications as come within the spirit and scope thereof.

I claim:

1. In the synthesis of hydrochloric acid from hydrogen and chlorine wherein the reacting gases contain appreciable amounts of incompletely oxidized carbon containing gas which normally forms free carbon under conditions obtaining within the reaction zone; the method of avoiding said free carbon formation which comprises adding controlled amounts of an oxidizing gas containing free oxygen.

2. The process defined in claim 1 wherein the oxidizing gas is air.

3. The process defined in claim 1 wherein the oxidizing gas is added after the main reaction between the hydrogen and chlorine has been substantially completed.

4. In the process defined in claim 1 wherein the oxidizing gas is added in separate increments around the outer fringe of the main reaction zone.

5. In the synthesis of hydrochloric acid from hydrogen and chlorine wherein the reacting gases contain an appreciable amount of incompletely oxidized carbon containing gas which normally forms free carbon under conditions obtaining within the reaction zone, the method of avoiding said free carbon formation which comprises adding controlled amounts of an oxygen containing gas after the main reaction between the hydrogen and chlorine has been substantially completed.

OSGOOD V. TRACY.